July 2, 1957  C. O. KELLEY  2,797,629
PIVOTED SHANK SUBSOIL CONTOUR PLOW
Filed Jan. 10, 1955  2 Sheets-Sheet 1

INVENTOR.
Carlton O. Kelley
BY
Wayland D. Keith
His Agent

July 2, 1957 C. O. KELLEY 2,797,629
PIVOTED SHANK SUBSOIL CONTOUR PLOW
Filed Jan. 10, 1955 2 Sheets-Sheet 2
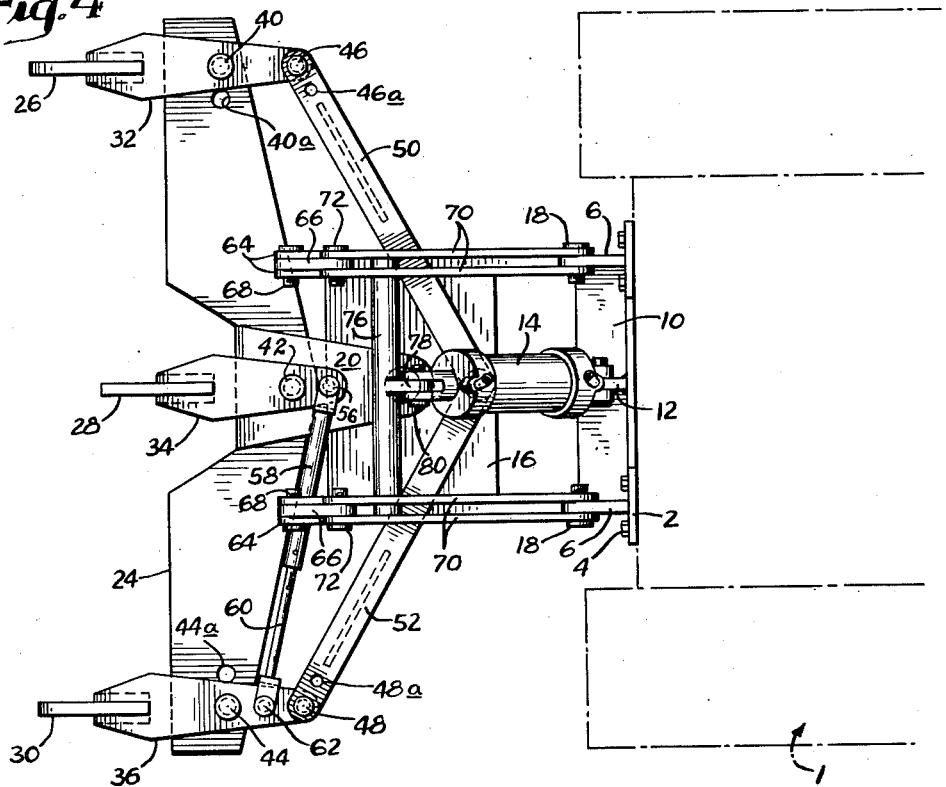
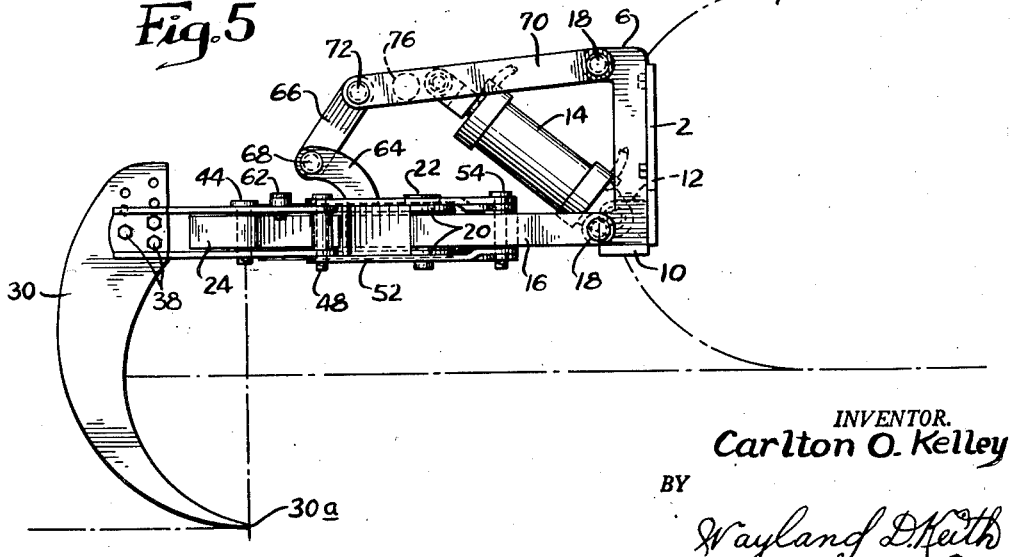
INVENTOR.
Carlton O. Kelley
BY
Wayland D. Keith
His Agent

United States Patent Office

2,797,629
Patented July 2, 1957

2,797,629

PIVOTED SHANK SUBSOIL CONTOUR PLOW

Carlton O. Kelley, Stamford, Tex., assignor to Leon O. Kelley, Stamford, Tex.

Application January 10, 1955, Serial No. 480,711

6 Claims. (Cl. 97—78)

This invention relates to improvements in contour subsoil plows and more particularly to plows which will follow in aligned relation to the line of travel of the prime mover, such as a tractor or the like.

Various subsoil plows have been proposed heretofore, but due to their construction, substantial strain was placed on the plow shanks, when the prime mover turned sharply, frequently resulting in the twisting of the plow shanks and the distortion of other parts of the framework of the plow.

In the present device, pivoted subsoil plow shanks have been provided, the points of which are substantially vertically below the point of the pivot and with the shanks, carrying the pivot points, attached by linkages to the prime mover in such manner as to instantly translate the turning movement of the prime mover directly to the shanks, so that the shanks will immediately align with the line of pull, thereby reducing the horse power necessary to pull the subsoil plow, as well as to alleviate the strain on the subsoil plow shanks, due to the turning, which strain has been present in devices heretofore.

An object of this invention is to provide, on a subsoil plow, a pivoted plow shank connected with the prime mover so the plow shank will pivot about the axis in such manner that the subsoil plow will follow the line of pull of the prime mover.

Another object of this invention is to provide, on a contour subsoil plow, a plurality of pivoted plow shanks, the points of which are directly below and in vertical alignment with the respective pivot points of the respective shanks, and with the shanks tied together by linkage, so as to be in parallel relation, then upon turning movement of the prime mover, the plow shanks will align with the line of pull of the prime mover.

Still another object of the invention is to provide a subsoil plow which has a plurality of pivoted plow shanks which may be adjusted transversely of the plow frame and yet pivot to follow the line of travel of the prime mover.

With these objects in mind and others that will manifest themselves as the description proceeds, reference is to be had to the accompanying drawings in which like reference characters designate like parts in the several views thereof, in which.

Figure 1:
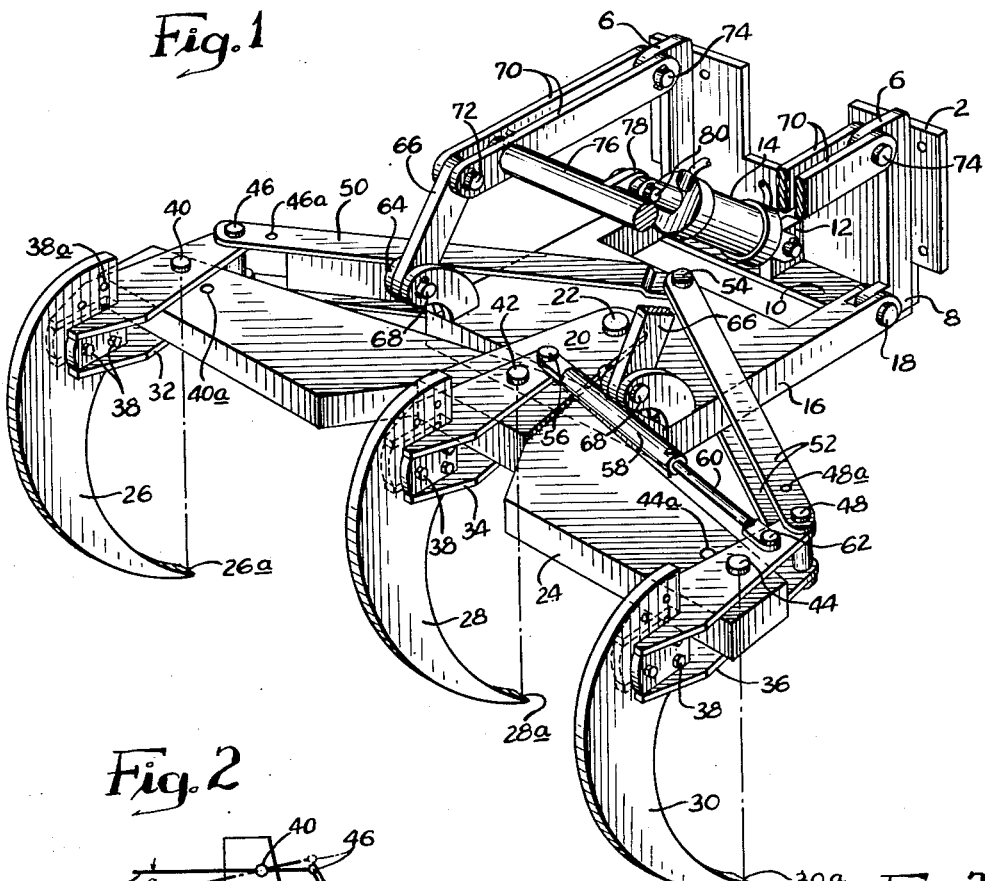
Fig. 1 is a perspective view of the contour subsoil plow taken from a side, top, and rear thereof, with parts broken away and shown in section, and showing the hydraulic lift mechanism, and the attachment plate for attaching the plow to the prime mover, such as a tractor.

Fig. 4 is a top plan view of the subsoil plow in full outline, and showing a prime mover, such as a crawler type tractor, in dot-dash outline, and showing the hydraulic hose connections leading to a conventional pump (not shown), which hose are broken away; and Fig. 5 is a side elevational view of the subsoil plow shanks shown in lowered position, and showing a fragmentary portion of a crawler type tractor in dot-dash outline.

With more detailed reference to the drawing, the numeral 1 designates generally a prime mover, such as a crawler type tractor, to which an implement attachment plate 2 is secured by means of bolts 4, as will best be seen in Figs. 4 and 5. The attachment plate 2 has outstanding lugs 6 and 8 secured thereto at the top and bottom respectively. A transverse bar 10 extends between the lower sides of the lugs 8 and has a lug 12 mounted thereon centrally thereof, which lug is welded to the bar 10 and to the implement attachment plate 2, so as to form a pivot point for the hydraulic cylinder 14.

A bifurcated plate 16 serves as a draw bar and is pivotally connected to lugs 8 by means of horizontal pivot pins 18 at its forward end. The rear portion of the bifurcated plate 16 has a vertically positioned hole therethrough which is adapted to register with a hole in the end of each of the forwardly extending ears 20 so a pin 22 will pass through these holes to pivotally connect the forwardly extending ears 20 to the draw bar 16. The ears 20 are secured to the top and bottom of cross beam 24, which beam is apertured in the center and near each end.

Three plow elements 26, 28, and 30 are adjustably secured to the respective forwardly extending ears 32, 34, and 36, by means of bolts 38, as will best be seen in Fig. 1. The respective ears 32, 34 and 36 are apertured to enable pins 40, 42, and 44 to pass therethrough and through the respective apertures in cross beam 24, so as to form pivots for the respective shanks of the plow elements 26, 28, and 30. The respective shanks 26, 28, and 30 have points 26a, 28a, and 30a, respectively, which are below and in substantial vertical alignment with the respective pivot points 40, 42, and 44, as indicated by the extended center line, Figs. 1 and 5, which center line extends from the axis of the respective pivot pins.

The ears 32 and 36 extend forward of the respective pivot pins 40 and 44 and are apertured to receive pivot pins 46 and 48, to which pivot pins linkages 50 and 52 are pivotally connected and which linkages 50 and 52 extend forward to connect to a central pivot pin 54 which passes through the forward ends of the linkages and through an aperture formed mediate the draw bar 16 near the forward side thereof. The distance between pivot pins 40 and 46, and the distance between pivot pins 44 and 48 is the same and the distance between pivot pins 22 and 54 is the same as the distance between pivot pins 40 and 46 and 44 and 48, which will maintain shanks 26 and 30 in parallel alignment at all times. Ears 34 extend forward of pivot pin 42 and are apertured to receive a pivot pin 56 to which a hollow pipe member 58 is connected. The member 58 telescopically receives a rod 60, through which passes a pin 62 which pin passes through an aperture within each of the ears 36, as will best be seen in Figs. 1 and 4. The apertures which receive pins 56 and 62 are of equal distance forward of pins 42 and 44 respectively. The pipe 58 and rod 60 are apertured at spaced intervals to receive a pin therethrough so as to secure ears 34 and 36 in fixed relation with respect to each other, which is usually in parallel relation, however, the rod 60 may be telescoped into pipe 58 when it is desired to move shanks 26 and 30 inward so that pivot pins 40 and 44 will pass through holes 40a and 44a in cross beam 24.

The shanks 26 and 30 are maintained in aligned relation with respect to each other by being connected by a parallel linkage arrangement 50—52, and the shank 28 is maintained parallel to shank 30 by parallel linkage 58—60. It will, therefore be seen that all the shanks are maintained in parallel relation at all times, within the operating range of the device.

The holes 38a are provided in the respective shanks 26, 28, and 30 to enable vertical adjustment of the shanks with respect to the ears 32, 34, and 36 respectively.

Pairs of ears 64 are provided near each rear corner of bifurcated draw bar plate 16, which ears are spaced apart to receive linkages 66. The linkages and the ears are apertured to receive pivot pins 68. The upper end of links are received by pairs of links 70. The links 66 and 70 are complementarily apertured to receive pins 72 therethrough. The inner end of links 70, as well as of lugs 6, are complementarily apertured to receive pivot pins 74. A transverse thrust bar 76 is secured to the respective pairs of links 70, and which bar has forwardly extending lug 78 thereon to which the plunger of hydraulic cylinder 14 is pivotally connected by means of pivot pin 80.

Holes 46a and 48a are provided in links 50 and 52 so as to receive pins 46 and 48 when the shanks 26 and 30 are moved inward so that pivot pins 40 and 44 will occupy holes 40a and 44a.

Operation

Figure 2:
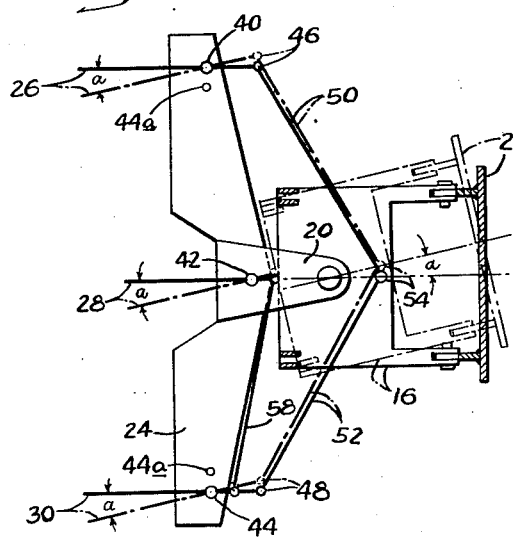
Fig. 2 is a diagrammatic plan view showing the straight line of movement of the plow in full outline, and an angular line of movement thereof, in dot-dash outline.
Figure 3:
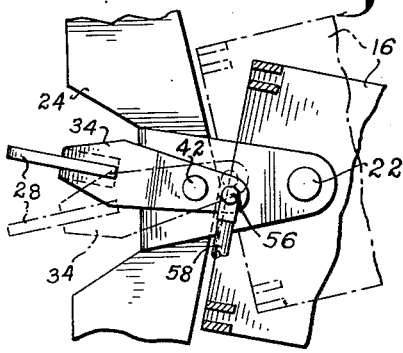
Fig. 3 is an enlarged plan view of the central pivot members shown in oppositely pivoted relation.

With the implement attachment plate 2 secured to the tractor 1, and with the hydraulic cylinder connected to suitable hydraulic controls and to a hydraulic pump, not shown, the device is ready to operate. Upon lowering the device by means of hydraulic cylinder 14 into the position as shown in Figs. 1 and 5, and upon forward movement of the tractor 1, the subsoil plows will move through the earth at a set depth. However, upon the tractor 1 changing course, as indicated in dot-dash outline in Fig. 2, the draw bar 16, will pivot about pivot pin 22 to move levers 50 and 52 to the left, which in turn will move the ears 32 and 36 about pivot pins 40 and 44, which will maintain shanks 26 and 30 parallel, as has been previously pointed out. With the linkage 58—60 interconnecting the upper portions of ears 34 and 36, respectively, shanks 28 and 30 will be maintained in aligned relation and in alignment with the line of pull of the tractor. With the ears 32, 34, and 36 connected by the links 50, 52 and 58—60, the angles a will be equal and the plow shanks will be aligned. It is to be pointed out, that the points 26a, 28a and 30a of the respective pivoted shanks are directly below and in vertical alignment with the respective pivot pins 40, 42, and 44, which prevents any side draft at the point of the plows, therefore less strain is exerted on the shanks and less power is required to pull the shanks through the soil.

By exerting pressure on hydraulic cylinder 14, thrust is applied to the lug 78 on cross bar 76 to lift linkage 70 about pivot point 74, whereupon, the bifurcated plate 16 is lifted by link 66, and since the forwardly extending ears 20 are of substantial thickness, to withstand the weight of the cross beam 24 and the respective plow elements 26, 28, and 30, the entire plow is pivoted about pivot pin 18 to lift the plow assembly above the surface of the terrain.

By adjusting the plow shanks 26, 28, and 30 vertically, and by securing the respective plow shanks to the respective ears 32, 34, and 36 by means of bolts 38, a set of adjustment may be accomplished, however, an individual adjustment may be made in accordance with the depth the subsoil ploy elements are to operate in a specific terrain, by manipulation of controls to cause hydraulic cylinder 14 to lift and maintain the plow elements at the desired level.

While the invention has been illustrated and described in some detail with respect to a plurality of plow elements, it to be understood that the number of plow elements may be varied, and that changes may be made in the minor details of construction without departing from the spirit of the invention or the scope of the appended claims.

Having thus clearly shown and described the invention what is claimed as new and desired to be secured by Letters Patent is:

1. A subsoil contour plow for attachment to a prime mover, comprising a frame, a draw bar pivotally attached to said frame and to said prime mover to pivot about a substantially horizontal axis, at least two substantially horizontally disposed, rearwardly extending plow shanks pivotally mounted on said frame to pivot about a substantially vertical axis, and linkage pivotally interconnecting said plow shanks and said draw bar to maintain said plow shanks in parallel relation so as to be self aligning with the line of travel of the prime mover.

2. The device substantially as set forth in claim 1, wherein: at least one additional substantially horizontally disposed, rearwardly extending plow shank is pivotally mounted on said frame to pivot about a substantially vertical axis, and linkage means interconnecting said last mentioned plow shank with one of said first mentioned plow shanks so as to maintain said shanks in parallel relation so as to be self aligning with the line of travel of the prime mover.

3. A subsoil contour plow for attachment to a prime mover, comprising a frame, a draw bar pivotally attached to said frame and to said prime mover to pivot about a substantially horizontal axis, at least two substantially horizontally disposed plow shank holding ears pivotally mounted on said frame and having portions thereof extending rearwardly of the pivot point on said frame, a curved plow shank secured to each of said holding ears and projecting downwardly and forwardly thereof so that the point of the respective plow shanks will be below and in substantial axial alignment with the respective pivot points of said holding ears, and linkage means pivotally interconnecting said plow shanks and said draw bar for maintaining said plow shanks in parallel alignment so as to be self aligning with the line of travel of the prime mover.

4. A subsoil contour plow for attachment to a prime mover, comprising a frame, a draw bar pivotally attached to said prime mover and to said frame to pivot about a substantially horizontal axis, at least two substantially horizontally disposed plow shank holding ears pivotally mounted on said frame and having portions thereof extending rearwardly of the pivot point on said frame, a plow shank secured to each of said holding ears and projecting downwardly and forwardly thereof so that the point of the respective plow shanks will be below and in substantial axial alignment with the respective pivot points of said holding ears, linkage means pivotally interconnecting said plow shanks and said draw bar for maintaining said plow shanks in parallel alignment, so as to be self-aligning with the line of travel of the prime mover, and power hoist means interconnecting said prime mover and said frame to pivotally move said frame about said horizontal axis.

5. A subsoil contour plow for attachment to a prime mover, comprising a frame, a draw bar pivotally attached to said frame and to said prime mover to pivot about a substantially horizontal axis, at least two substantially horizontally disposed plow shanks holding ears pivotally mounted on said frame, a part of the respective ears extending forwardly of the respective pivot points, and a part of the respective ears extending rearwardly thereof, a plow shank secured to each rearwardly extending portion of the respective ears, a link pivotally connected to each forwardly extending portion of said respective ears an equal spaced distance forward of the pivot points thereof, the other end of which links pivotally connect to said draw bar a spaced distance ahead of the pivot point of said draw bar equal to the spacing from said pivot points on said ears to the respective pivot points on the rear portion of said links.

6. A subsoil contour plow, substantially as defined in claim 1; wherein at least one additional, substantially horizontally disposed, rearwardly extending plow shank is pivotally mounted on said frame to pivot about a substantially vertical axis, the pivot point of which is substantially forward of the transverse, vertical plane passing through said two first named pivot points, and linkage means interconnecting said last mentioned plow shank with one of said first mentioned plow shanks so as to maintain said plow shanks in parallel relation so as to be self-aligning with the line of travel of said prime mover.

References Cited in the file of this patent

UNITED STATES PATENTS

| | | |
|---|---|---|
| 817,540 | Adams | Apr. 10, 1906 |
| 2,593,679 | Kaupke | Apr. 22, 1952 |